(12) United States Patent
Hayashi

(10) Patent No.: US 11,785,157 B2
(45) Date of Patent: Oct. 10, 2023

(54) INFORMATION PROCESSING METHOD, INFORMATION PROCESSING APPARATUS, AND NON-TRANSITORY COMPUTER-READABLE STORAGE MEDIUM STORING AN INFORMATION PROCESSING PROGRAM FOR PRINTING IMAGE ON THREE-DIMENSIONAL MEDIUM

(71) Applicant: SEIKO EPSON CORPORATION, Tokyo (JP)

(72) Inventor: Ryotaro Hayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/657,985

(22) Filed: Apr. 5, 2022

(65) Prior Publication Data

US 2022/0321721 A1 Oct. 6, 2022

(30) Foreign Application Priority Data

Apr. 5, 2021 (JP) .................................. 2021-063972

(51) Int. Cl.
*G06K 15/00* (2006.01)
*H04N 1/00* (2006.01)

(52) U.S. Cl.
CPC ..... *H04N 1/00663* (2013.01); *G06K 15/4065* (2013.01); *H04N 1/00559* (2013.01)

(58) Field of Classification Search
None
See application file for complete search history.

(56) References Cited

U.S. PATENT DOCUMENTS

| | | | | |
|---|---|---|---|---|
| 2010/0242760 | A1* | 9/2010 | Otsuka ................... | B41F 27/005 101/382.1 |
| 2014/0326152 | A1* | 11/2014 | Gartner ............... | B41F 27/1268 101/477 |
| 2014/0333946 | A1* | 11/2014 | Nakamura ............. | G01B 11/25 358/1.12 |
| 2016/0107468 | A1* | 4/2016 | Leynadier .............. | B41J 11/008 347/16 |
| 2016/0292546 | A1* | 10/2016 | Yamashita ......... | G06K 15/1843 |
| 2020/0164666 | A1* | 5/2020 | Scheele ..................... | G03F 9/00 |
| 2022/0317957 | A1* | 10/2022 | Hayashi ................ | G06F 3/1208 |

FOREIGN PATENT DOCUMENTS

JP 2018-202837 12/2018

* cited by examiner

*Primary Examiner* — Dung D Tran
(74) *Attorney, Agent, or Firm* — WORKMAN NYDEGGER

(57) ABSTRACT

An information processing method is configured for printing a first image by using a flatbed printer including a mounting table for mounting a first medium and a printing device for printing the first image on the first medium. The information processing method includes generating a second image indicating a position as a reference to mount the first medium on the mounting table, causing the printing device to print the second image on a second medium mounted on the mounting table, and causing the printing device to print the first image on the first medium mounted on the second medium having the printed second image.

7 Claims, 5 Drawing Sheets

INFORMATION PROCESSING METHOD, INFORMATION PROCESSING APPARATUS, AND NON-TRANSITORY COMPUTER-READABLE STORAGE MEDIUM STORING AN INFORMATION PROCESSING PROGRAM FOR PRINTING IMAGE ON THREE-DIMENSIONAL MEDIUM

The present application is based on, and claims priority from JP Application Serial Number 2021-063972, filed Apr. 5, 2021, the disclosure of which is hereby incorporated by reference herein in its entirety.

BACKGROUND

1. Technical Field

The present disclosure relates to an information processing method, an information processing apparatus, and a non-transitory computer-readable storage medium storing an information processing program.

2. Related Art

Flatbed printers are known as printing devices for printing images mainly on three-dimensional or thick mediums. The flatbed printers print images by using, for example, an ink jet method on mediums including relatively large mediums made of acryl or wood such as panels and signboards and relatively small mediums such as coasters in the state in which the mediums are mounted on a mounting table.

On the mounting table of the flatbed printer, a pre-cut medium is mounted at a print position. In the known flatbed printers, the print position is set by using, for example, software programs such as print applications. In particular, in the field of commercial printing, software programs such as raster image processor (RIP) software programs are utilized.

For example, JP-A-2018-202837 describes a technology of combining as a set of print data a plurality of data items of print images respectively corresponding to individual mediums with respect to setting of print position. In this technology, the layout of print images is set by specifying margins between the print images on an operational screen displayed on a display device of a computer or an operation panel of a flatbed printer.

However, when the technology described in JP-A-2018-202837 is used, it is necessary to position, with reference to a scale marked on a mounting table, a medium at a print position specified by a software program. When a medium is positioned in this manner, problems may arise in which it takes time to position individual mediums, and the medium may be positioned at a wrong location because the medium is positioned in accordance with numbers visually checked on the scale.

SUMMARY

An information processing method according to an aspect of the present disclosure is configured for printing a first image by using a flatbed printer including a mounting table for mounting a first medium and a printing device for printing the first image on the first medium. The information processing method includes generating a second image indicating a position as a reference to mount the first medium on the mounting table, causing the printing device to print the second image on a second medium mounted on the mounting table, and causing the printing device to print the first image on the first medium mounted on the second medium having the printed second image.

An information processing apparatus according to an aspect of the present disclosure is configured to print a first image by using a flatbed printer including a mounting table for mounting a first medium and a printing device for printing the first image on the first medium. The information processing apparatus includes an image generation unit configured to generate a second image indicating a position as a reference to mount the first medium on the mounting table, a first print control unit configured to cause the printing device to print the second image on a second medium mounted on the mounting table, and a second print control unit configured to cause the printing device to print the first image on the first medium mounted on the second medium having the printed second image.

A non-transitory computer-readable storage medium stores an information processing program according to an aspect of the present disclosure. The information processing program is configured for printing a first image by using a flatbed printer including a mounting table for mounting a first medium and a printing device for printing the first image on the first medium. The information processing program causes a computer to implement an image generation function of generating a second image indicating a position as a reference to mount the first medium on the mounting table, a first print control function of causing the printing device to print the second image on a second medium mounted on the mounting table, and a second print control function of causing the printing device to print the first image on the first medium mounted on the second medium having the printed second image.

DESCRIPTION OF EXEMPLARY EMBODIMENTS

Figure 1:
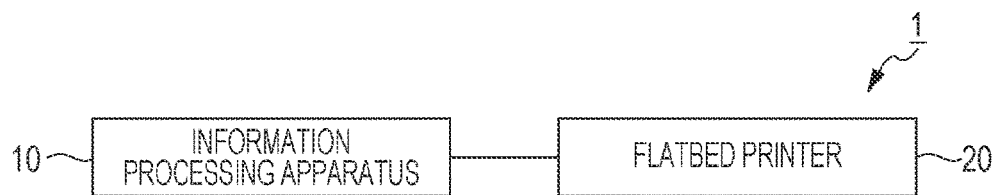
FIG. 1 is a block diagram illustrating a configuration of an information processing system according to an embodiment.

Hereinafter, an information processing method, an information processing apparatus, and an information processing program according to an embodiment will be described with reference to the drawings. In the drawings, the measurements and scale of individual elements may be different from the actual measurements and scale when appropriate. Because the embodiment described below is a preferred specific example, the embodiment includes various technically preferred limitations. The scope of the present disclosure is, however, not limited by the limitations unless the following description mentions that particular limitations limit the present disclosure.

1. Overall Configuration

FIG. 1 is a block diagram illustrating a configuration of an information processing system 1 according to the embodiment of the present disclosure. The information processing system 1 includes an information processing apparatus 10 and a flatbed printer 20. The information processing apparatus 10 and the flatbed printer 20 are coupled to each other in a communicable manner. The configuration illustrated in FIG. 1 is a mere example and should not be construed in a limiting sense. For example, a plurality of flatbed printers 20 may be coupled to one information processing apparatus 10 in a communicable manner.

The information processing system 1 is used to print images mainly on three-dimensional or thick mediums mounted on a mounting table 230 included in the flatbed printer 20. The mounting table 230 will be described later.

More specifically, to print a first image on a first medium, the information processing system 1 prints a position as a second image on a second medium. The position is used as a reference to mount the first medium on the mounting table 230. With reference to the second image printed on the second medium, the first medium is mounted on the second medium on the mounting table 230. The first image is printed on the mounted first medium.

The "first medium" denotes a medium on which the flatbed printer 20 prints a main image. The "first image" denotes a main image printed on the first medium. The "second medium" denotes a medium that is mounted on the mounting table 230 and on which the first medium is mounted. The "second image" denotes an image that is printed on the second medium and that indicates a position used as a reference to mount the first medium on the second medium.

The information processing apparatus 10 generates the second image. The information processing apparatus 10 causes the flatbed printer 20 to print the second image on the second medium mounted on the mounting table 230. The information processing apparatus 10 further causes the flatbed printer 20 to print the first image on the first medium mounted on the second medium on the mounting table 230.

The flatbed printer 20 prints by an ink jet method on a print medium under the control of the information processing apparatus 10. The print medium is any medium suitable for printing by the ink jet method and may be, but not limited to, for example, various kinds of paper, cloth, or film. In the present embodiment, the print medium may be a three-dimensional or thick medium.

In the present embodiment, under the control of the information processing apparatus 10, the flatbed printer 20 prints the second image on the second medium mounted on the mounting table 230. Under the control of the information processing apparatus 10, the flatbed printer 20 further prints the first image on the first medium mounted on the second medium on the mounting table 230.

2. Configuration of Information Processing Apparatus

Figure 2:
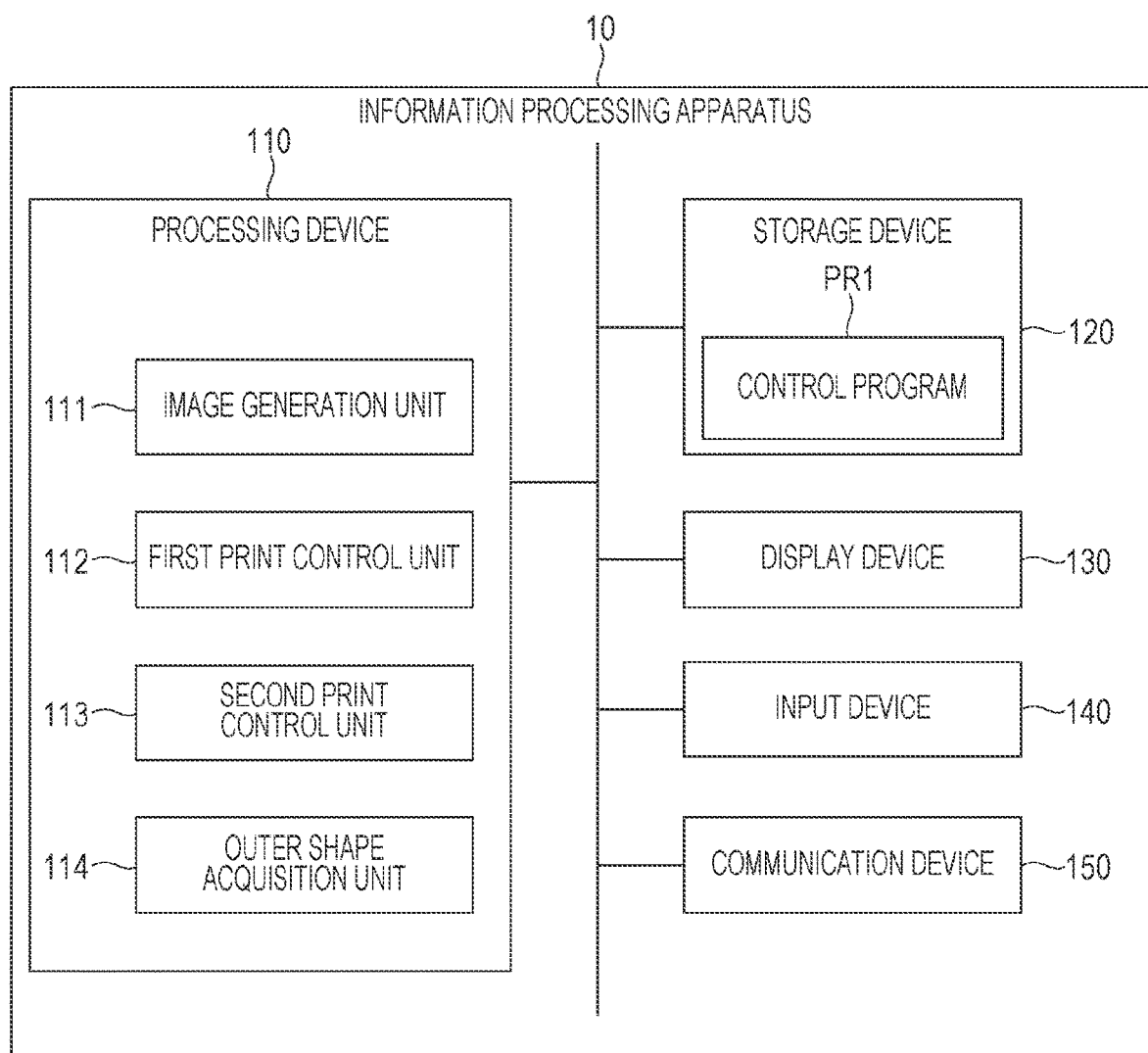
FIG. 2 is a block diagram illustrating a configuration of an information processing apparatus.

FIG. 2 is a block diagram illustrating a configuration example of the information processing apparatus 10. The information processing apparatus 10 may be typically, but not limited to, a personal computer (PC) but may be, for example, a tablet terminal or smartphone. The information processing apparatus 10 includes a processing device 110, a storage device 120, a display device 130, an input device 140, and a communication device 150. The elements of the information processing apparatus 10 are coupled to each other by one or more buses for communicating information.

The processing device 110 is a processor for controlling the entire information processing apparatus 10. The processing device 110 is formed by one or more chips. The processing device 110 is implemented by, for example, a central processing unit (CPU) including elements such as an interface for peripherals, an arithmetic unit, and a register. Part or all of the function of the processing device 110 may be implemented by a hardware device such as a digital signal processor (DSP), application-specific integrated circuit (ASIC), programmable logic device (PLD), or field-programmable gate array (FPGA). The processing device 110 performs different processing operations in a parallel or successive manner.

The storage device 120 is a recording medium readable by the processing device 110. The storage device 120 stores a plurality of programs including a control program PR1 run by the processing device 110 and a program for operating a raster image processor (RIP) mentioned above. The storage device 120 stores the first image to be printed on the first medium and the second image to be printed on the second medium. The storage device 120 may be implemented by, for example, at least one of a read-only memory (ROM), an erasable programmable read-only memory (EPROM), an electrically erasable programmable read-only memory (EEPROM), and a random-access memory (RAM). The storage device 120 may also be referred to as, for example, a register, a cache, a main memory, or a primary storage device.

The display device 130 displays images and textual information. The display device 130 displays various kinds of images under the control of the processing device 110. Various kinds of display panels such as a liquid crystal display panel and an organic electroluminescent (EL) display panel may be used as the display device 130.

The input device 140 receives operations by a user. The input device 140 includes, for example, a keyboard, a touch pad, a touch panel, or a pointing device such as a mouse. When the input device 140 includes a touch panel, the input device 140 may also function as the display device 130.

The communication device 150 is a hardware device serving as a transceiver to communicate with other devices, especially with the flatbed printer 20. The communication device 150 is also referred to as, for example, a network device, a network controller, a network card, or a communication module.

The processing device 110 operates as an image generation unit 111, a first print control unit 112, a second print control unit 113, and an outer shape acquisition unit 114 by running the control program PR1 read from the storage device 120. The control program PR1 may be sent from another device such as a server managing the information processing apparatus 10 through a communication network.

The image generation unit 111 generates the second image indicating a position used as a reference to mount the first medium on the mounting table 230. More specifically, when a user of the information processing system 1 configures print setting for the first image by using, for example, a software program such as a RIP software program mentioned above, the image generation unit 111 generates the second image indicating a position used as a reference to mount the first medium on the mounting table 230.

Figure 3:
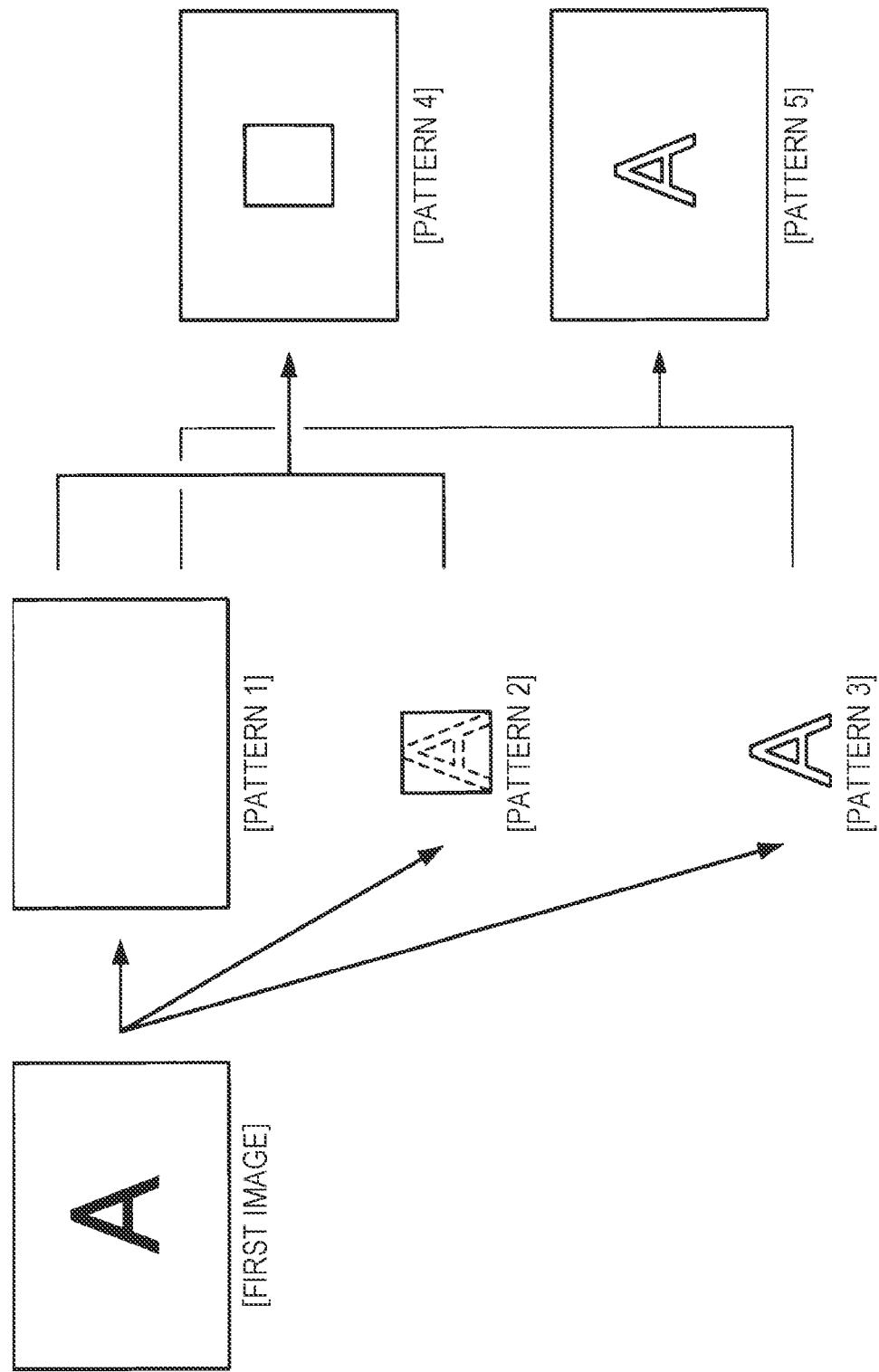
FIG. 3 illustrates print patterns of a second image in the information processing system.

FIG. 3 illustrates examples of the second image. As illustrated in "Pattern 1" in FIG. 3, the second image may include part of a frame line indicating the outline of the first image. For example, when the outline of the first image is shaped in a rectangle, the second image may be the rectangle, or L-shaped lines or points that indicate vertices of the rectangle. When the outline of the first image matches the outline of the first medium, the second image may also include part of a frame line indicating the outline of the first medium.

Alternatively, when the outer shape acquisition unit 114 acquires the outer shape of the first medium as will be described later, the second image may include, as "Pattern 1" in FIG. 3, part of a frame line indicating the outline of the first medium acquired by the outer shape acquisition unit 114. In this case, the part of the frame line indicating the outline of the first medium does not necessarily match part or all of the outline of the first image.

Alternatively, as illustrated as "Pattern 2" in FIG. 3, when the first image includes an object, such as an alphabet letter "A" in FIG. 3, the second image may include part of a frame line of a quadrangle contacting the outline of the object "A" included in the first image. Alternatively, as illustrated as "Pattern 3" in FIG. 3, the second image may include part of the outline of the object "A" included in the first image. Alternatively, as illustrated as "Pattern 4" in FIG. 3, the second image may include both part of the frame line indicating the outline of the first image or the first medium and part of the frame line of the quadrangle contacting the outline of the object included in the first image. Alternatively, as illustrated as "Pattern 5" in FIG. 3, the second image may include part of the frame line indicating the outline of the first image or the first medium and part of the outline of the object "A" included in the first image. Particularly when the first medium is not transparent, and the second image is smaller than the first medium in the case of using "Pattern 2" or "Pattern 3" as the second image, "Pattern 4" and "Pattern 5" are suitable for the second image.

The first print control unit 112 causes the flatbed printer 20 to print the second image on the second medium mounted on the mounting table 230.

The second print control unit 113 causes the flatbed printer 20 to print the first image on the first medium mounted on the second medium with the printed second image.

The outer shape acquisition unit 114 acquires the outer shape of the first medium. Specifically, for example, when the information processing apparatus 10 or the flatbed printer 20 includes a scanner, the outer shape acquisition unit 114 acquires the outer shape of the first medium read by the scanner. Alternatively, when the user of the information processing system 1 inputs the outer shape of the first medium by means of the input device 140, the outer shape acquisition unit 114 acquires the outer shape of the first medium inputted with the input device 140. It should be noted that the outer shape acquisition unit 114 is a non-essential constituent element. This means that the processing device 110 does not necessarily include the outer shape acquisition unit 114.

3. Configuration of Flatbed Printer

Figure 4:
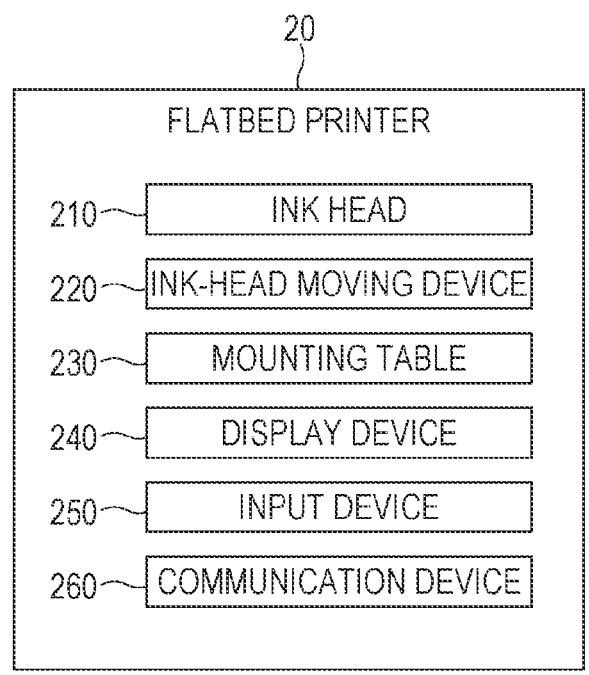
FIG. 4 is a block diagram illustrating a configuration of a flatbed printer.

FIG. 4 is a block diagram illustrating a configuration example of the flatbed printer 20. The flatbed printer 20 includes an ink head 210, an ink-head moving device 220, the mounting table 230, a display device 240, an input device 250, and a communication device 260.

The ink head 210 is a device that ejects ink onto the second medium mounted on the mounting table 230 and the first medium mounted on the second medium. The ink head 210 ejects onto the first medium and the second medium, under the control of the information processing apparatus 10, ink supplied from an ink cartridge, which is not illustrated in the drawing, from a plurality of nozzles, which are also not illustrated in the drawing. More specifically, the ink head 210 includes for the respective nozzles pressure chambers and drive elements, which are not illustrated in the drawing; the ink head 210 changes pressure in the pressure chambers by using the drive elements to eject ink in the pressure chambers from the nozzles. The drive elements may be, for example, piezoelectric elements or heating elements. The number of colors of ink ejected by the ink head 210 is not limited. The ink head 210 may be referred to as "printing device" in this specification.

The ink-head moving device 220 is a mechanism for moving the ink head 210 relative to the mounting table 230. In the present embodiment, the ink-head moving device 220 moves the ink head 210 in main and sub scanning directions that are parallel to the mounting table 230. In the flatbed printer 20, ink is ejected while the ink head 210 is moved, and as a result, an image is formed on a printing surface of the first medium or the second medium as a print medium.

The mounting table 230 is a table for mounting the first medium and the second medium as print mediums. The mounting table 230 is positioned under the ink head 210.

The display device 240 displays images and textual information. The display device 240 displays various kinds of images under the control of a processing device not illustrated in the drawing. Various kinds of display panels such as a liquid crystal display panel and an organic EL display panel may be used as the display device 240.

The input device 250 receives operations by a user. The input device 250 includes, for example, a touch pad, a touch panel, or a pointing device such as a mouse. When the input device 250 includes a touch panel, the input device 250 may also function as the display device 240.

The communication device 260 is a hardware device serving as a transceiver to communicate with other devices, especially with the information processing apparatus 10. The communication device 260 is also referred to as, for example, a network device, a network controller, a network card, or a communication module.

4. Operation of Information Processing System 1

Figure 5:
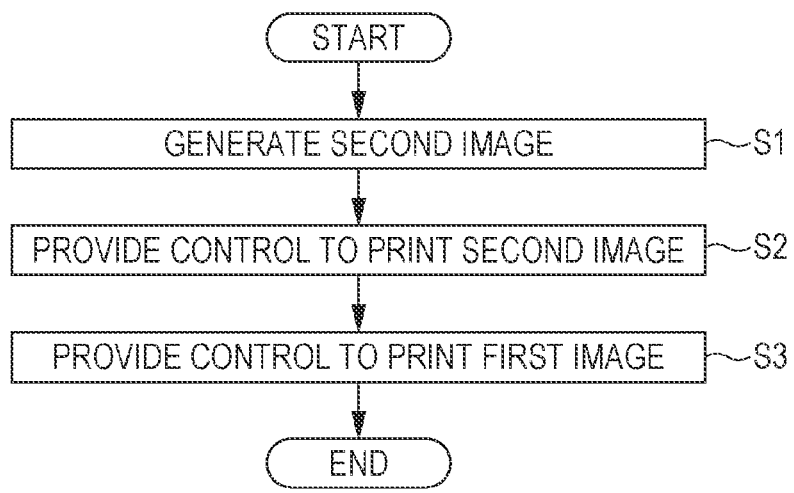
FIG. 5 is a flowchart illustrating an example of an operation of the information processing system.

Next, an operation of the information processing system 1 will be described with reference to FIGS. 5 and 6A to 6D. FIG. 5 is a flowchart illustrating an example of the operation of the information processing system 1. FIGS. 6A to 6D are drawings for illustrating appearances of the first image and the second image in the case of the example of the operation of the information processing system 1.

Figure 6A:
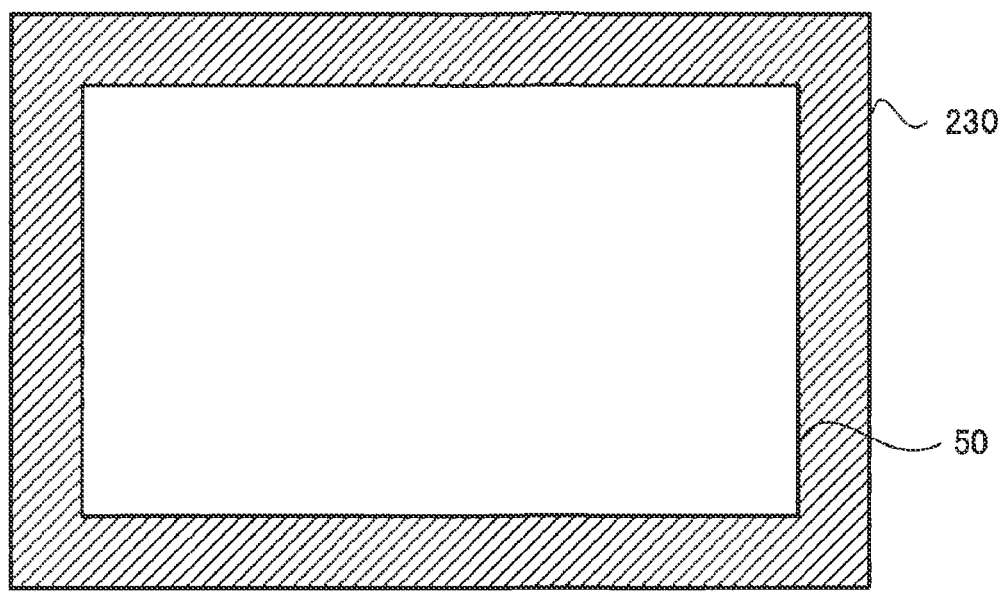
FIG. 6A is a drawing for illustrating an appearance of a first image and the second image in the case of the example of the operation of the information processing system.

Firstly, the image generation unit 111 generates second images 51A to 51H described later, which indicate positions as references to mount first mediums 52A to 52H described later, on a second medium 50 mounted on the mounting table 230 by a user as illustrated in FIG. 6A (S1).

Figure 6B:
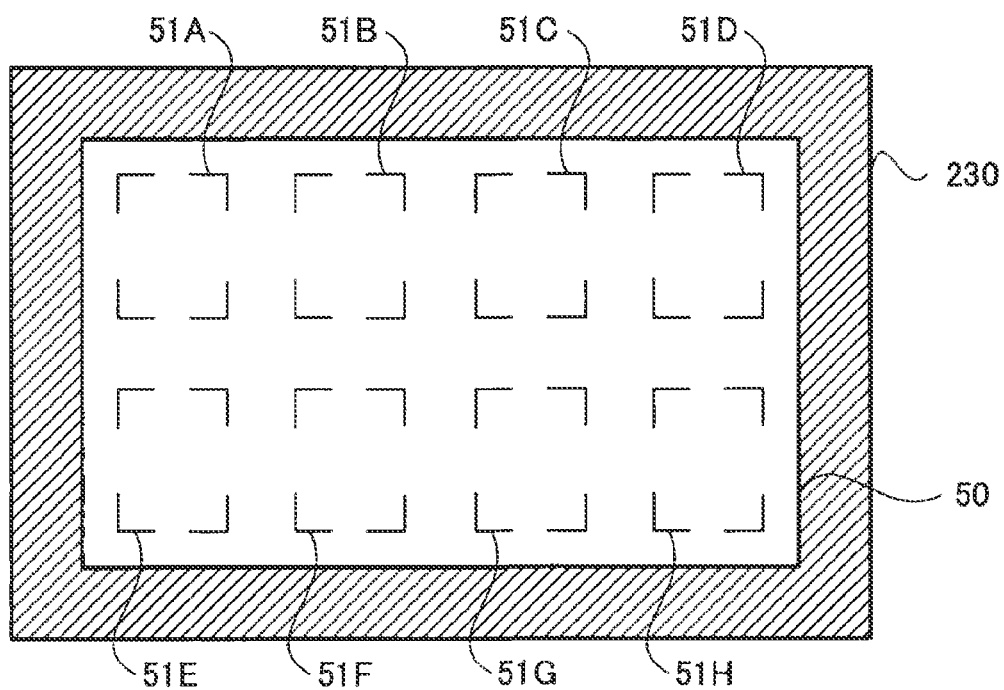
FIG. 6B is a drawing for illustrating an appearance of the first image and the second image in the case of the example of the operation of the information processing system.

Next, the first print control unit 112 causes the flatbed printer 20 to print the second images 51A to 51H on the second medium 50 mounted on the mounting table 230 as illustrated in FIG. 6B (S2).

Figure 6C:
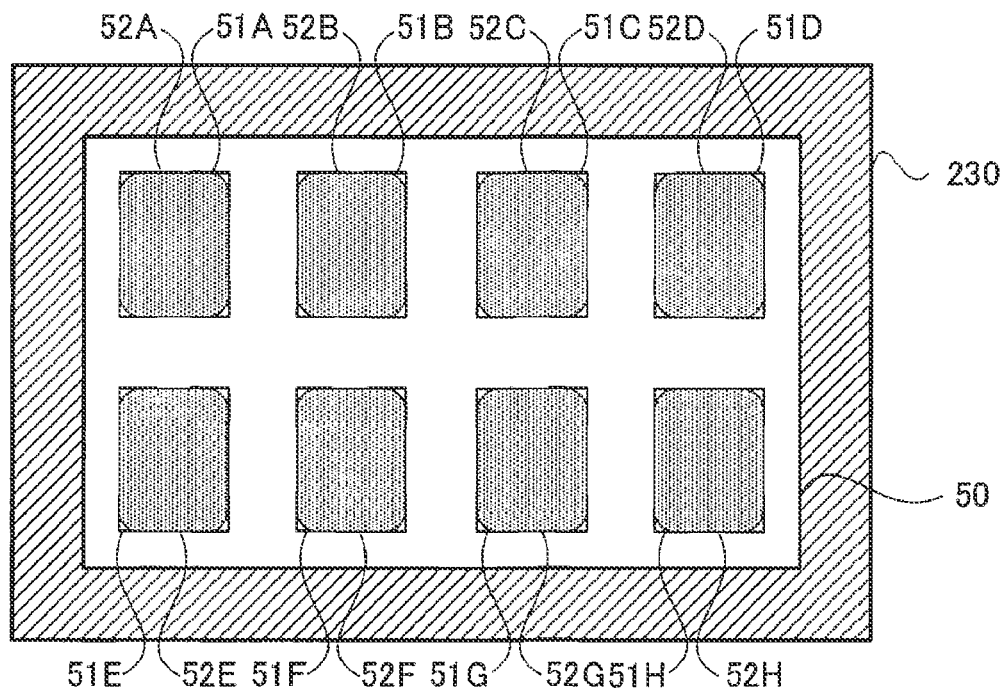
FIG. 6C is a drawing for illustrating an appearance of the first image and the second image in the case of the example of the operation of the information processing system.

As illustrated in FIG. 6C, the user of the information processing system 1 mounts the first mediums 52A to 52H on the second medium 50 in the state in which the first mediums 52A to 52H coincide with the positions of the printed second images 51A to 51H.

Figure 6D:
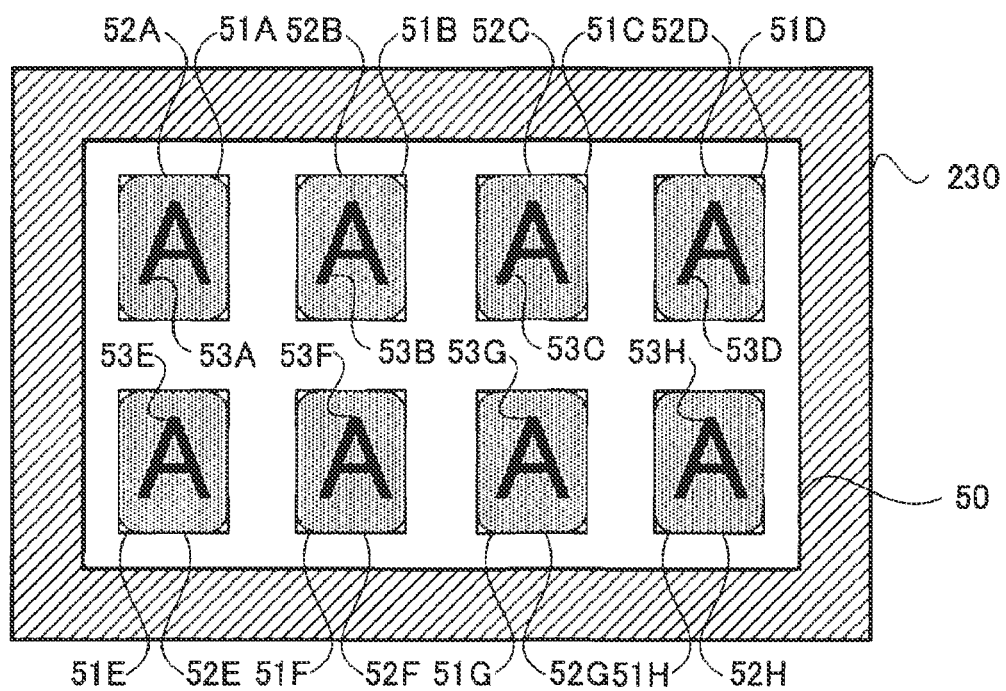
FIG. 6D is a drawing for illustrating an appearance of the first image and the second image in the case of the example of the operation of the information processing system.

Finally, the second print control unit 113 causes the flatbed printer 20 to print first images 53A to 53H on the first mediums 52A to 52H mounted on the second medium 50 as illustrated in FIG. 6D (S3).

5. Effects Achieved by Information Processing System 1

As described above, the present embodiment provides an information processing method for printing the first image by using the flatbed printer 20 including the mounting table 230 for mounting the first medium and the ink head 210 for printing the first image on the first medium. The information processing method includes generating the second image indicating a position as a reference to mount the first medium on the mounting table 230, causing the ink head 210 to print the second image on the second medium mounted on the mounting table 230, and causing the ink head 210 to print the first image on the first medium mounted on the second medium having the printed second image.

Because a position as a reference to mount the first medium is printed on the second medium mounted on the mounting table 230, the user of the information processing system 1 can reduce time taken to arrange individual first mediums and also more precisely position the first mediums.

According to the present embodiment, the second image may include part of a frame line indicating the outline of the first image.

With this configuration, the first medium can be mounted on the second medium to match a print position of the first image.

According to the present embodiment, the second image may include part of a frame line indicating the outline of the first medium.

With this configuration, the user of the information processing system 1 can mount the first medium on the second medium at the printed outline of the first medium.

According to the present embodiment, the second image may include part of a frame line of a quadrangle contacting the outline of an object included in the first image.

With this configuration, the user of the information processing system 1 can more precisely mount the first medium to match a print position of the first image.

According to the present embodiment, the second image may include part of the outline of an object included in the first image.

With this configuration, when the first image is different in size from the first medium, and the outer shape of the first medium is not quadrangular, the user of the information processing system 1 can more precisely mount the first medium to match a print position of the first image.

6. Modifications

The present disclosure is not limited to the embodiment described above. For example, in the information processing system 1, the information processing apparatus 10 may be included in a housing of the flatbed printer 20 so that the information processing apparatus 10 and the flatbed printer 20 are combined together.

What is claimed is:

1. An information processing method for printing a first image by using a flatbed printer including a flat mounting table for mounting a first medium and a printing device for printing the first image on the first medium, the information processing method comprising:
generating a second image, which matches boundaries of the first medium on the flat mounting table;
causing the printing device to print the second image on a second medium mounted on the flat mounting table, by ink jet printing; and
causing the printing device to print the first image on the first medium mounted on the second medium with reference to the second image printed on the second medium, by inkjet printing.

2. The information processing method according to claim 1, wherein
the boundaries of the first medium include part of a frame line indicating an outline of the first image.

3. The information processing method according to claim 1, wherein
the boundaries of the first medium include part of a frame line of a quadrangle contacting an outline of an object included in the first image.

4. The information processing method according to claim 1, wherein
the boundaries of the first medium include part of an outline of an object included in the first image.

5. The information processing method according to claim 1, further comprising precisely mounting the first medium according to the first image.

6. An information processing apparatus configured to print a first image by using a flatbed printer including a flat mounting table for mounting a first medium and a printing device for printing the first image on the first medium, the information processing apparatus comprising:
a processor; and
a memory including one or more programs that, when executed by the processor, implement functions of:
an image generation unit configured to generate a second image, which matches boundaries of the first medium, on the flat mounting table;
a first print control unit configured to cause the printing device to print the second image on a second medium mounted on the flat mounting table, by ink jet printing; and
a second print control unit configured to cause the printing device to print the first image on the first medium mounted on the second medium with reference to the second image printed on the second medium, by inkjet printing.

7. A non-transitory computer-readable storage medium storing an information processing program for printing a first image by using a flatbed printer including a flat mounting table for mounting a first medium and a printing device for printing the first image on the first medium, the information processing program causing a computer to implement:
an image generation function of generating a second image, which matches boundaries of the first medium on the flat mounting table;
a first print control function of causing the printing device to print the second image on a second medium mounted on the flat mounting table; and
a second print control function of causing the printing device to print the first image on the first medium mounted on the second medium with reference to the second image printed on the second medium, by inkjet printing.

* * * * *